(12) United States Patent
Miyashita et al.

(10) Patent No.: US 9,899,889 B2
(45) Date of Patent: Feb. 20, 2018

(54) MOTOR STRUCTURE WITH FRAME STRUCTURE HAVING BEARING HOUSING FORMED INTEGRALLY THEREWITH

(71) Applicant: SANYO DENKI CO., LTD., Tokyo (JP)

(72) Inventors: Toshihito Miyashita, Tokyo (JP); Manabu Horiuchi, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 408 days.

(21) Appl. No.: 14/656,214

(22) Filed: Mar. 12, 2015

(65) Prior Publication Data
US 2015/0263582 A1 Sep. 17, 2015

(30) Foreign Application Priority Data
Mar. 14, 2014 (JP) .................................. 2014-052708

(51) Int. Cl.
| | | |
|---|---|---|
| *H02K 5/16* | (2006.01) | |
| *H02K 5/00* | (2006.01) | |
| *H02K 1/06* | (2006.01) | |
| *H02K 5/15* | (2006.01) | |
| *H02K 15/16* | (2006.01) | |

(52) U.S. Cl.
CPC .............. *H02K 5/161* (2013.01); *H02K 5/15* (2013.01); *H02K 15/16* (2013.01)

(58) Field of Classification Search
CPC .................................. H02K 5/20; H02K 1/27
USPC ... 310/89, 216.114, 400, 405, 406, 408–411, 310/413, 415, 422, 90
See application file for complete search history.

(56) References Cited

U.S. PATENT DOCUMENTS

| | | | | |
|---|---|---|---|---|
| 2,417,195 A | * | 3/1947 | Hargreaves | F16B 7/20 220/319 |
| 2,774,026 A | * | 12/1956 | Towner | G05D 3/183 310/162 |
| 3,599,024 A | * | 8/1971 | Kitamura | H02K 19/24 310/163 |

(Continued)

FOREIGN PATENT DOCUMENTS

| | | |
|---|---|---|
| JP | 53-114007 | 9/1978 |
| JP | 06-038438 | 2/1994 |

(Continued)

OTHER PUBLICATIONS

Japanese Office Action dated Aug. 29, 2017 for the corresponding Japanese Patent Application No. 2014-052708.

*Primary Examiner* — Jose Gonzalez Quinones
(74) *Attorney, Agent, or Firm* — Rankin, Hill & Clark LLP

(57) ABSTRACT

A motor structure includes: a frame accommodating a stator and a rotor therein; an output-side bracket; an output-side bearing; a housing portion for supporting the output-side bearing, the housing portion being formed integrally with an output-side end of the frame and serving as a first fitting protrusion to be fitted into the output-side bracket; a flange portion formed integrally with an anti-output-side end of the frame and having an opening; an anti-output-side bearing; an anti-output-side bracket for accommodating the anti-output-side bearing therein; and a protrusion formed integrally with the anti-output-side bracket to be fitted into the opening of the flange portion.

14 Claims, 5 Drawing Sheets

(56) References Cited

U.S. PATENT DOCUMENTS

| | | | | |
|---|---|---|---|---|
| 5,977,671 A * | 11/1999 | Kim | ............... | H02K 29/08 |
| | | | | 310/101 |
| 8,742,639 B2 * | 6/2014 | Teimel | ............... | H02K 5/00 |
| | | | | 310/91 |
| 2008/0197733 A1 * | 8/2008 | Oberle | ............... | H02K 7/1166 |
| | | | | 310/89 |
| 2011/0187215 A1 * | 8/2011 | Sahara | ............... | H02K 23/04 |
| | | | | 310/89 |

FOREIGN PATENT DOCUMENTS

| | | |
|---|---|---|
| JP | 3014812 | 8/1995 |
| JP | 08-098457 | 4/1996 |
| JP | 11-332166 | 11/1999 |
| JP | 2009-100531 | 5/2009 |

\* cited by examiner

MOTOR STRUCTURE WITH FRAME STRUCTURE HAVING BEARING HOUSING FORMED INTEGRALLY THEREWITH

CROSS-REFERENCE TO RELATED APPLICATION

This application claims priority from Japanese Patent Application No. 2014-052708 filed with the Japan Patent Office on Mar. 14, 2014, the entire content of which is hereby incorporated by reference.

BACKGROUND

1. Technical Field

The present disclosure relates to a motor structure.

2. Description of the Related Art

A motor generally includes a stator portion, a rotor portion, an output-side (load-side) bracket, and an anti-output-side (anti-load-side) bracket. The output-side and anti-output-side brackets each have a housing portion. The housing portions support output-side and anti-output-side bearings. The output-side and anti-output-side bearings rotatably support the rotating shaft of the rotor. The output-side bearing is a part that is often damaged because it is strongly susceptible to an applied load.

A technique relating to housing portions for supporting bearings is disclosed in JP-A-06-38438, for example. In a motor bracket made of aluminum disclosed in this document, a cup-shaped iron bush having a plurality of small apertures running therethrough is insert-molded in a housing portion supporting a bearing of a motor rotor.

JP-A-2009-100531 discloses an inner rotor brushless motor. In this motor, a housing portion for supporting an output-side bearing is formed integrally with a frame (case). An opening is formed on one side of the frame, and a case lid and a sensor substrate are arranged on the opening side. A housing portion for supporting an anti-output-side bearing is formed in the case lid.

SUMMARY

A motor structure includes: a frame accommodating a stator and a rotor therein; an output-side bracket; an output-side bearing; a housing portion for supporting the output-side bearing, the housing portion being formed integrally with an output-side end of the frame and serving as a first fitting protrusion to be fitted into the output-side bracket; a flange portion formed integrally with an anti-output-side end of the frame and having an opening; an anti-output-side bearing; an anti-output-side bracket for accommodating the anti-output-side bearing therein; and a protrusion formed integrally with the anti-output-side bracket to be fitted into the opening of the flange portion.

DESCRIPTION OF THE EMBODIMENTS

Figure 1:
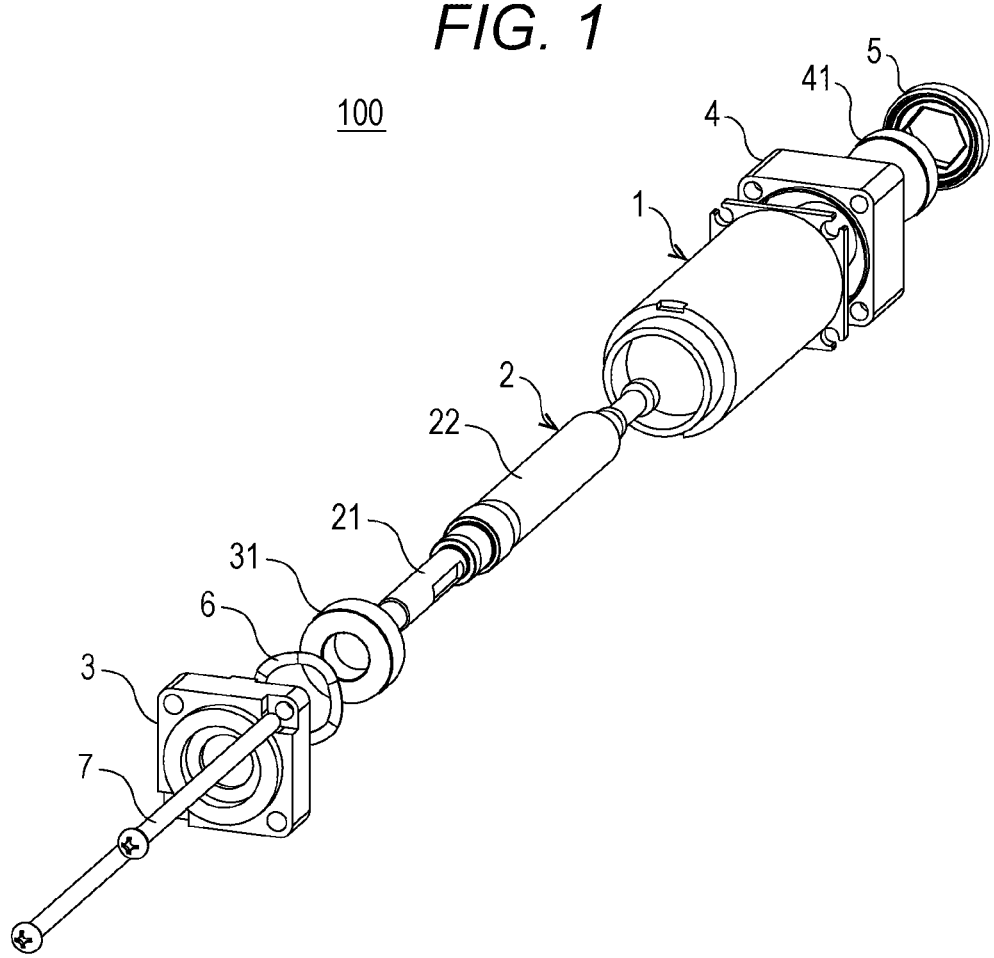
FIG. 1 is an exploded perspective view illustrating a motor structure of a first embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to the technique of JP-A-06-38438, a bracket made of aluminum is provided with a cup-shaped housing portion of the same material. Since the hardness of bearing steel is high, the housing portion side, with a lower hardness, wears away from the sliding movement between an outer ring of a bearing and the housing portion. In view of this, an iron bush is molded in the housing portion made of aluminum so as to reduce the wear of the housing portion.

However, the bracket having the housing portion for supporting the bearing and the frame are formed by separate parts. Therefore, rotor misalignment between the housing portion and the frame (e.g., the center of the inner diameter (the axial center) of the housing portion and the center of the inner diameter (the axial center) of the frame being misaligned from each other) is likely to occur. If an excessive moment load acts upon the bearing due to the rotor misalignment, the bearing may be damaged.

According to the technique of JP-A-2009-100531, the housing portion for supporting the output-side bearing is formed integrally with the frame. A motor mount plate, which allows a motor to be attached to a device such as an encoder, is screwed to the frame.

However, if the radial size of the motor is small, it is difficult to ensure a space used when screwing the motor mount plate and the frame together. Thus, the assembly operation is difficult.

It is an object of the present disclosure to provide a motor structure which allows for easy rotor alignment between the housing portion for supporting the bearing and the frame (e.g., making the center of the inner diameter (the axial center) of the housing portion and the center of the inner diameter (the axial center) of the frame coincide or substantially coincide with each other).

It is also an object of the present disclosure to provide a motor structure, with which it is possible to prevent or reduce the wear of the housing portion for supporting the output-side bearing and to allow for an easy assembly operation of the motor mount plate.

A motor structure according to an aspect of the present disclosure includes: a frame accommodating a stator and a rotor therein; an output-side bracket; an output-side bearing; a housing portion for supporting the output-side bearing, the housing portion being formed integrally with an output-side end of the frame and serving as a first fitting protrusion to be fitted into the output-side bracket; a flange portion formed integrally with an anti-output-side end of the frame and having an opening; an anti-output-side bearing; an anti-output-side bracket for accommodating the anti-output-side bearing therein; and a protrusion formed integrally with the anti-output-side bracket to be fitted into the opening of the flange portion.

In this motor structure, the housing portion (the first fitting protrusion) of the frame is fitted into the output-side bracket. Moreover, the protrusion of the anti-output-side bracket is fitted into the opening of the flange portion. Therefore, this motor structure allows for easy rotor alignment between the housing portion for supporting the bearing and the frame.

Motor structures of first and second embodiments will be described with reference to the drawings.

In the motor structure of the first embodiment, an output-side bracket is fitted over a fitting protrusion of a frame. Moreover, a protrusion of an anti-output-side bracket is fitted into an opening of a flange portion. Therefore, according to the first embodiment, it is possible to provide a motor structure which allows for easy rotor alignment between a housing portion for supporting a bearing and the frame.

First Embodiment

Configuration of Motor Structure

Figure 2:
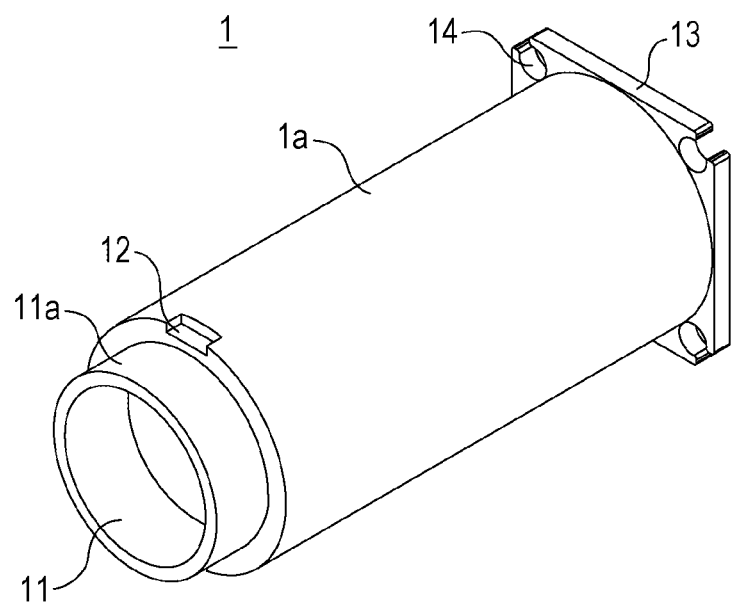
FIG. 2 is a perspective view illustrating a frame of the first embodiment as seen from an output side.
Figure 3:
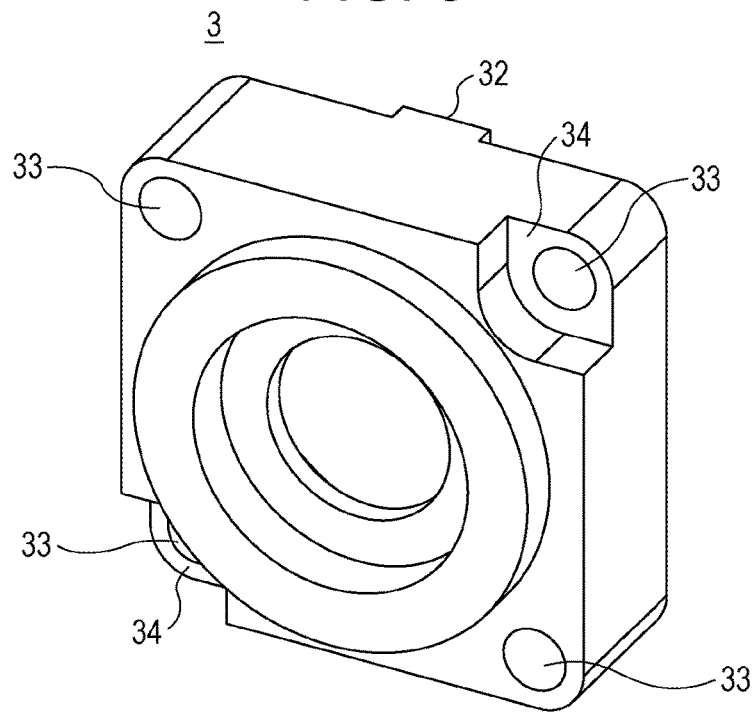
FIG. 3 is a perspective view illustrating an output-side bracket of the first embodiment.
Figure 4:
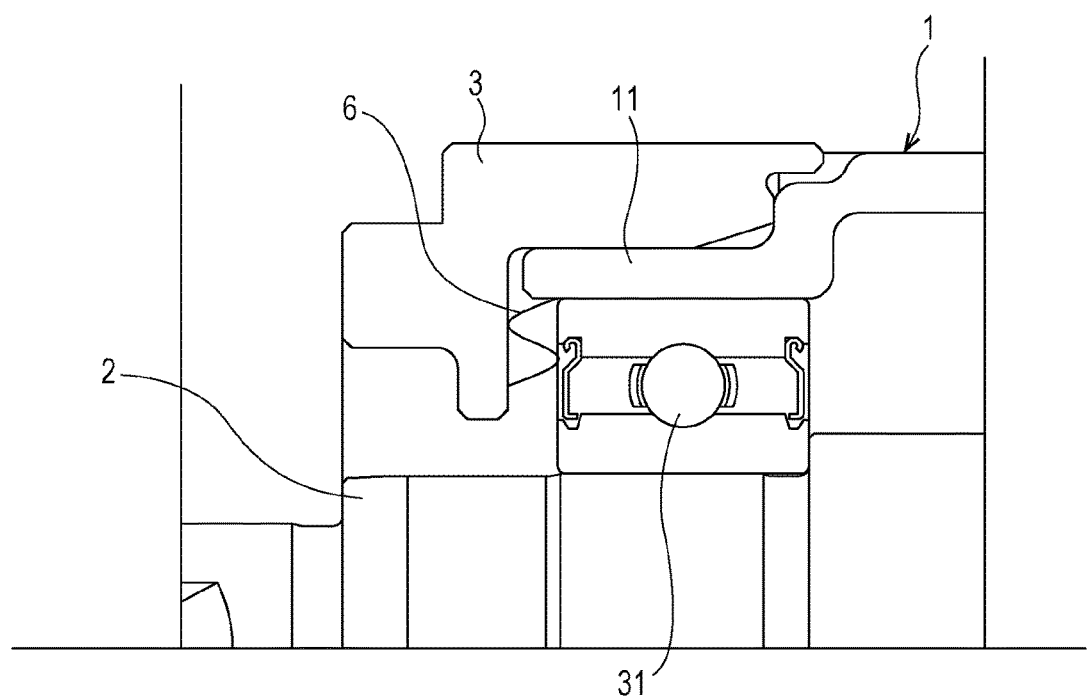
FIG. 4 is a cross-sectional view illustrating the vicinity of an output-side bearing of the first embodiment.
Figure 5:
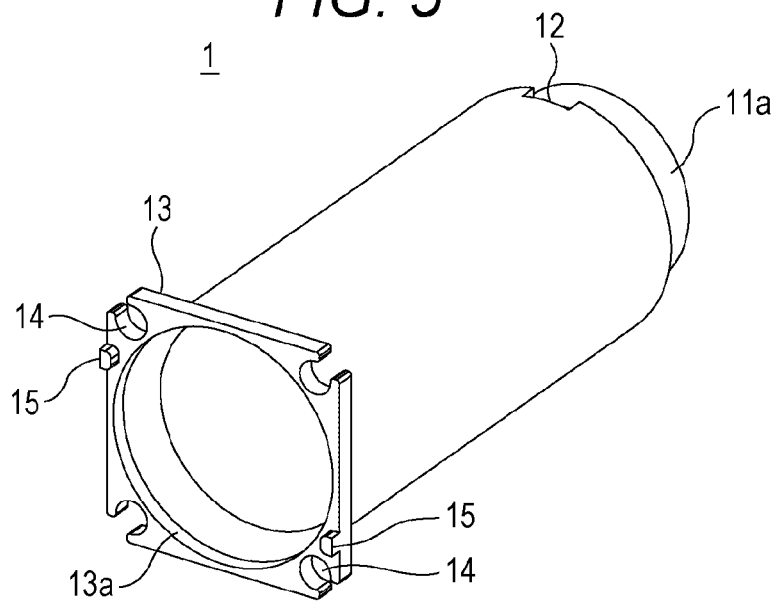
FIG. 5 is a perspective view illustrating the frame of the first embodiment as seen from an anti-output side.
Figure 6:
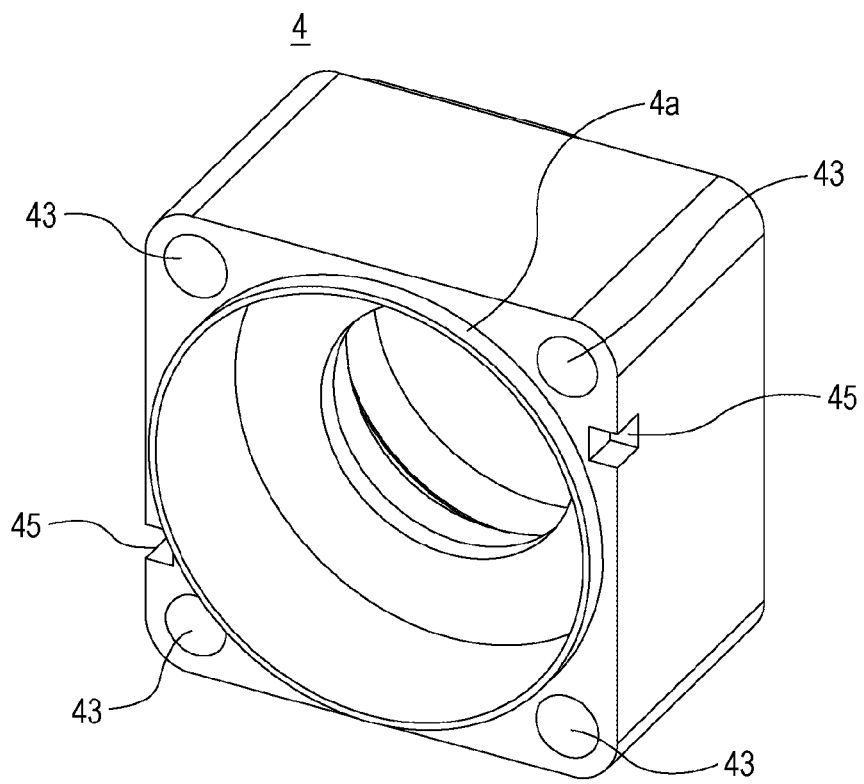
FIG. 6 is a perspective view illustrating an anti-output-side bracket of the first embodiment.

First, referring to FIGS. 1 to 6, the configuration of the motor structure of the first embodiment will be described. FIG. 1 is an exploded perspective view illustrating the motor structure of the first embodiment. FIG. 2 is a perspective view illustrating the external appearance of the frame of the first embodiment. FIG. 3 is a perspective view illustrating the output-side bracket of the first embodiment. FIG. 4 is a cross-sectional view illustrating the vicinity of the output-side bearing of the first embodiment. FIG. 5 is a perspective view illustrating the frame of the first embodiment as seen from the anti-output side. FIG. 6 is a perspective view illustrating the anti-output-side bracket of the first embodiment.

The motor structure of the present embodiment is particularly suitable for a motor with a small radial size.

As illustrated in FIG. 1, a motor 100 of the present embodiment includes, as its primary components, a frame 1, a stator (not illustrated), a rotor 2, an output-side bracket 3, and an anti-output-side bracket 4.

As illustrated in FIGS. 1 and 2, the frame 1 is a metal member having a substantially cylindrical shape. A cylindrical space is defined in the frame 1 for accommodating the stator (not illustrated) and the rotor 2. That is, the frame 1 accommodates the stator and the rotor 2.

A housing portion 11 for supporting an output-side bearing 31 is formed on the output-side end in the axial direction of the frame 1. The inner outer diameter of the housing portion 11 is smaller than the inner outer diameter of the frame 1. The housing portion 11 projects toward the output side as a fitting protrusion 11a (first fitting protrusion) to be fitted into the output-side bracket 3. That is, the housing portion 11 is formed integrally with the output-side end of the frame 1, and serves as the first fitting protrusion to be fitted into the output-side bracket 3. A positioning depression 12 is formed between the housing portion 11 (the fitting protrusion 11a) and an outermost cylindrical portion 1a of the frame 1. The positioning depression 12 is used when the output-side bracket 3 is fitted over the frame 1. That is, the positioning depression 12 formed in the frame 1 is a part of the first positioning structure for positioning the frame 1 and the output-side bracket 3 with each other.

A flange portion 13 having an opening at the center thereof is formed integrally with the frame 1 on the anti-output-side end in the axial direction of the frame 1. The flange portion 13 has a substantially rectangular shape. The flange portion 13 projects radially outwardly from the outermost cylindrical portion 1a of the frame 1. Mounting holes 14 are provided at the four corners of the flange portion 13. The mounting holes 14 are provided as arc-shaped cutouts.

The frame 1, including the housing portion 11 and the flange portion 13, is made of an iron-based ferromagnetic material. That is, the frame 1 has a structure that functions as a stator core, and also as a magnetic circuit of the motor 100. As the frame 1 is made of an iron-based material, it is possible to enhance the hardness of the housing portion 11 for supporting the output-side bearing 31, which receives a substantial load thereon. As a result, it is possible to prevent or reduce the wear of the housing portion 11.

The frame 1 also functions as a back yoke core. Therefore, the frame 1 has the function of closing the magnetic field line to thereby maximize the action of electromagnetic induction. Moreover, the frame 1 also has the function of preventing or suppressing the impact on peripheral devices around the motor by a magnetic field resulting from electromagnetic induction. Thus, the frame 1 is configured to serve also as a back yoke core. This improves the coaxial precision between the inner diameter of the stator core and the output-side bearing 31 (e.g., the precision by which the center of the inner diameter (the axial center) of the stator core coincides with the center of the inner diameter (the axial center) of the output-side bearing 31).

The rotor 2 includes a coil 22 wound around a rotating shaft 21. The rotor 2 is accommodated in the frame 1 with a gap between the rotor 2 and the stator.

The output-side bracket 3 is fitted over the fitting protrusion 11a of the frame 1. That is, a fitting depression (not illustrated) to be fitted over the fitting protrusion 11a of the frame 1 is formed on the abutment surface of the output-side bracket 3.

As illustrated in FIG. 3, a positioning protrusion 32 is formed on the contact surface of the output-side bracket 3 which contacts the frame 1. The positioning protrusion 32 engages with the positioning depression 12 of the frame 1. That is, the positioning protrusion 32 is a part of the first positioning structure for positioning the frame 1 and the output-side bracket 3 with each other. Through holes 33, allowing through bolts 7 described later to pass therethrough, are formed at the four corners of the output-side bracket 3. Seat surfaces 34 for receiving the heads of the through bolts 7 to rest thereon are formed around two diagonally-positioned through holes 33.

The output-side bearing 31 is accommodated in the housing portion 11 of the frame 1. As illustrated in FIG. 1 and FIG. 4, the motor 100 includes a precompressed spring 6. The precompressed spring 6 is sandwiched between the output-side bearing 31 and the output-side bracket 3. As the precompressed spring 6 is sandwiched between the output-side bearing 31 and the output-side bracket 3, an axial pressure acts upon the output-side bearing 31.

Moreover, the whole or part of the precompressed spring 6 is placed within the housing portion 11 of the frame 1. The amount of precompression is determined by the position of the anti-output-side abutment surface of the output-side bracket 3. Setting (arranging) the precompressed spring 6 prevents or reduces the possibility for the motor 100 to be assembled with the peripheral portion of the precompressed spring 6 being caught in the outer ring joint portion of the output-side bearing 31.

The rectangular block-shaped anti-output-side bracket 4 is attached to the flange portion 13. An anti-output-side bearing 41 is accommodated in the anti-output-side bracket 4. The anti-output-side bearing 41 is fixed by being sandwiched between the anti-output-side bracket 4 and a bearing bolt 5. That is, the motor 100 includes the bearing bolt 5. The anti-output-side bearing 41 is fixed in the anti-output-side bracket 4 by the bearing bolt 5.

As illustrated in FIG. 5, a circular opening 13*a* is formed at the center of the flange portion 13. Fitting protrusions 15 (second fitting protrusions) are formed on the abutment surface of the flange portion 13 which abuts against the anti-output-side bracket 4. The fitting protrusions 15 project toward the anti-output-side bracket 4. The fitting protrusions 15 are formed at two locations in the vicinity of two diagonally-positioned mounting holes 14.

On the other hand, as illustrated in FIG. 6, a ring-shaped protrusion 4*a* is formed integrally with the anti-output-side bracket 4 at the center of the anti-output-side bracket 4. The ring-shaped protrusion 4*a* is a portion to be fitted into the circular opening 13*a* of the flange portion 13. Fitting depressions 45 are formed on the abutment surface of the anti-output-side bracket 4 which abuts against the flange portion 13. The fitting depressions 45 are formed in two portions corresponding to the fitting protrusions 15 of the flange portion 13 of the anti-output-side bracket 4. The fitting protrusions 15 of the flange portion 13 are fitted into the fitting depressions 45 of the anti-output-side bracket 4. That is, the fitting protrusions 15 and the fitting depressions 45 are included as the second positioning structure for positioning the flange portion 13 and the anti-output-side bracket 4 with each other. Through holes 43 are formed at the four corners of the anti-output-side bracket 4. The through bolts 7 and mounting bolts 9 to be described later are inserted through the through holes 43.

When the flange portion 13 of the frame 1 and the anti-output-side bracket 4 are assembled together, the ring-shaped protrusion 4*a* of the anti-output-side bracket 4 is fitted into the circular opening 13*a* of the flange portion 13. Moreover, the fitting protrusions 15 of the flange portion 13 are fitted into the fitting depressions 45 of the anti-output-side bracket 4. This allows for easy positioning between the anti-output-side bracket 4 and the flange portion 13. Incidentally, the fitting protrusions may be formed on the abutment surface of the anti-output-side bracket 4 and the fitting depressions may be formed on the abutment surface of the flange portion 13.

The motor 100 includes two through bolts 7. Members from the output-side bracket 3 to the anti-output-side bracket 4 are fastened together by the two through bolts 7. The two through bolts 7 are inserted so that the heads of the through bolts 7 rest on the seat surfaces 34 of the output-side bracket 3. The output-side bracket 3, the frame 1 and the anti-output-side bracket 4 are assembled together as an integral unit by means of the two through bolts 7. The rotating shaft 21 of the rotor 2 is rotatably supported by the output-side bearing 31 and the anti-output-side bearing 41. That is, the through bolts 7 are inserted through the output-side bracket 3 and the anti-output-side bracket 4 from the output side so that the frame 1 is sandwiched between the output-side bracket 3 and the anti-output-side bracket 4, and fasten the output-side bracket 3 and the anti-output-side bracket 4 together.

[Function of Motor Structure]

Next, the function of the motor structure of the first embodiment will be described with reference to FIGS. 1 to 8.

In the motor structure of the present embodiment, the housing portion 11 for supporting the output-side bearing 31 is formed integrally with the frame 1 on the output-side end of the frame 1 in its axial direction. The output-side bearing 31 is accommodated in the housing portion 11 of the frame 1.

The housing portion 11 projects toward the output side as the fitting protrusion 11*a* to be fitted into the output-side bracket 3. The fitting depression (not illustrated) of the output-side bracket 3 is fitted over the housing portion 11 (the fitting protrusion 11*a*). When the output-side bracket 3 and the frame 1 are fitted together, the positioning protrusion 32 of the output-side bracket 3 engages with the positioning depression 12 of the frame 1.

The frame 1 serves both as a stator core and as a back yoke core. This improves the coaxial precision between the stator core inner diameter and the output-side bearing 31.

The frame 1 is made of an iron-based ferromagnetic material. Therefore, it is possible to enhance the hardness of the housing portion 11 for supporting the output-side bearing 31, which receives a substantial load thereon. As a result, it is possible to prevent or reduce the wear of the housing portion 1.

That is, with the motor structure of the present embodiment, the hardness of the material of the housing portion 11 for supporting the output-side bearing 31 is high. Thus, it is possible to prevent or reduce the wear of the housing portion 11. Moreover, the housing portion 11 for supporting the output-side bearing 31 and the frame 1 are integral with each other, and thus rotor alignment is easily performed.

The precompressed spring 6 is sandwiched between the output-side bearing 31 and the output-side bracket 3. Thus, an axial pressure can act upon the output-side bearing 31 (see FIG. 4).

Moreover, the motor structure of the present embodiment includes a structure (the second positioning structure) for positioning the flange portion 13 of the frame 1 and the anti-output-side bracket 4 with each other (see FIGS. 5 and 6). The flange portion 13 is formed integrally with the frame 1. Moreover, the anti-output-side bearing 41 is accommodated in the housing portion of the anti-output-side bracket 4. Therefore, according to the present embodiment, it is possible to improve the coaxial precision between the inner diameter of the stator core and the anti-output-side bearing 41 (e.g., the precision by which the center of the inner diameter (the axial center) of the stator core coincides with the center of the inner diameter (the axial center) of the anti-output-side bearing 41).

Incidentally, the motor structure of the present embodiment may be simply referred to as a motor (the motor 100).

Second Embodiment

Figure 7:
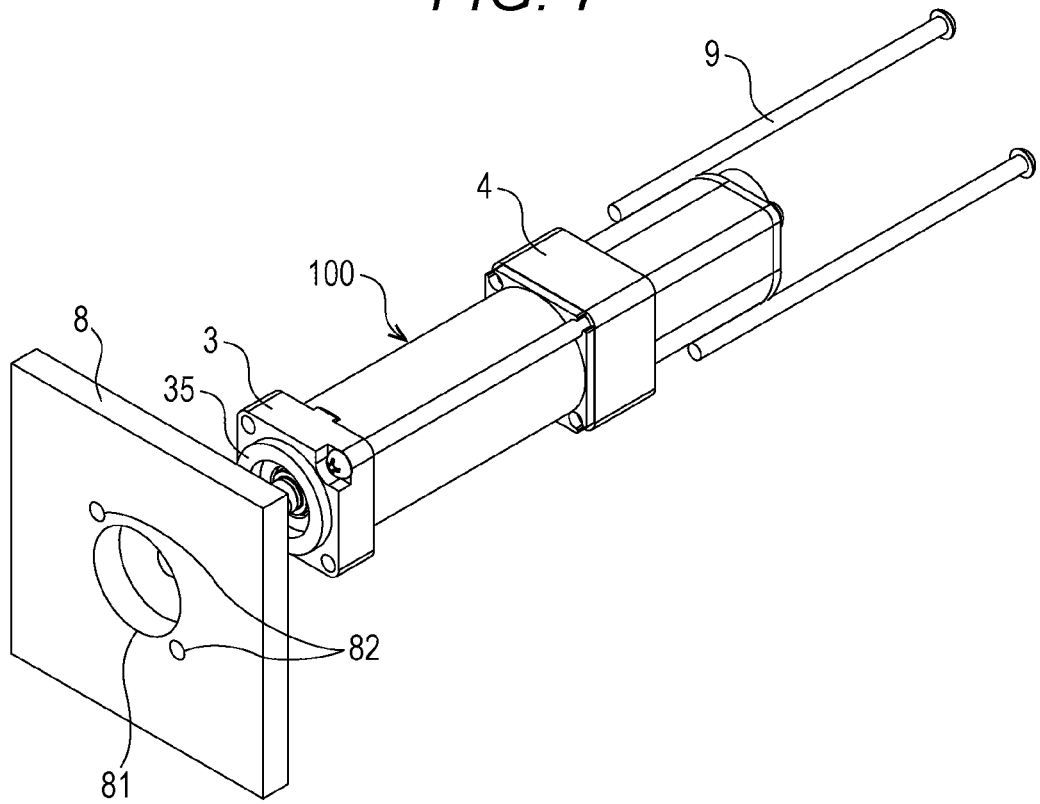
FIG. 7 is a perspective view illustrating a motor mount plate of a second embodiment before being assembled.
Figure 8:
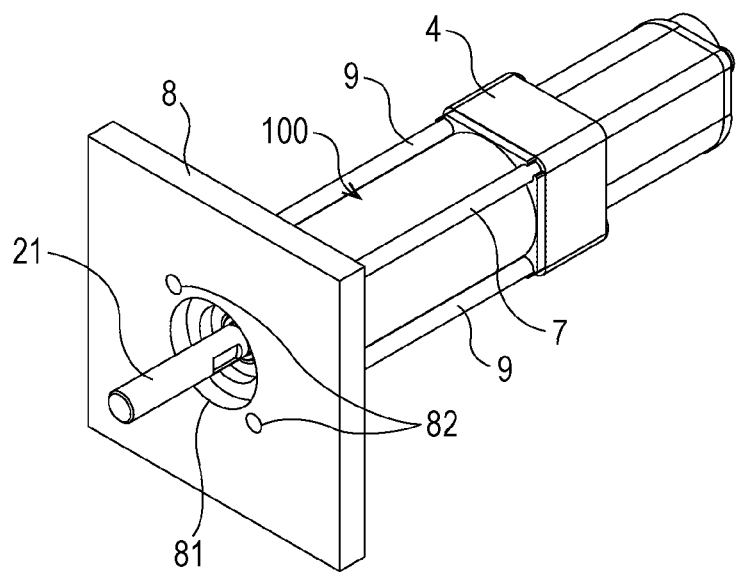
FIG. 8 is a perspective view illustrating the motor mount plate of the second embodiment after being assembled.

Next, a motor mount plate assembly structure in a motor structure of the second embodiment will be described with reference to FIGS. 7 to 10. FIG. 7 is a perspective view illustrating a motor mount plate of the second embodiment before being assembled. FIG. 8 is a perspective view illustrating the motor mount plate of the second embodiment after being assembled. Note that the same elements as those of the first embodiment will be denoted by the same reference numerals and descriptions thereof will be omitted.

The motor structure of the present embodiment includes the motor 100, a motor mount plate 8, and the mounting bolts 9. As illustrated in FIGS. 7 and 8, the motor mount plate 8 is assembled so that the motor mount plate 8 abuts against the output-side bracket 3 of the motor 100. That is, the motor mount plate 8 is arranged so as to abut against the output-side bracket 3. A circular opening 81 for exposing the output end of the rotating shaft 21 is formed at the center of the motor mount plate 8. A protruding ring portion 35 formed on the output-side end surface of the output-side bracket 3 is fitted into the opening 81.

Female threaded portions 82, into which the mounting bolts 9 are screwed, are formed in the vicinity of the opening 81 of the motor mount plate 8. The female threaded portions 82 are formed at two locations so as to correspond to the two diagonally-positioned through holes 33.

The mounting bolts 9 of the motor mount plate 8 are inserted from the anti-output side. Seat surfaces (not illustrated) for receiving the heads of the mounting bolts 9 to rest thereon are formed on the anti-output-side bracket 4. As the seat surfaces for the mounting bolts 9 of the motor mount plate 8 are arranged on the anti-output-side bracket 4, the operation of mounting the motor 100 onto the motor mount plate 8 can be performed from the anti-output side. That is, the mounting bolts 9 are inserted through the anti-output-side bracket 4 and the motor mount plate 8 from the anti-output side, thereby fastening together the anti-output-side bracket 4 (i.e., the motor 100) and the motor mount plate 8.

Thus, in the motor structure of the present embodiment, the operation of mounting the motor 100 onto the motor mount plate 8 can be performed from the anti-output side. This allows for an easy operation of mounting the motor 100 onto the motor mount plate 8.

Now, a conventional motor mount plate assembly structure will be described as a comparative example with reference to FIGS. 9 and 10.

Figure 9:
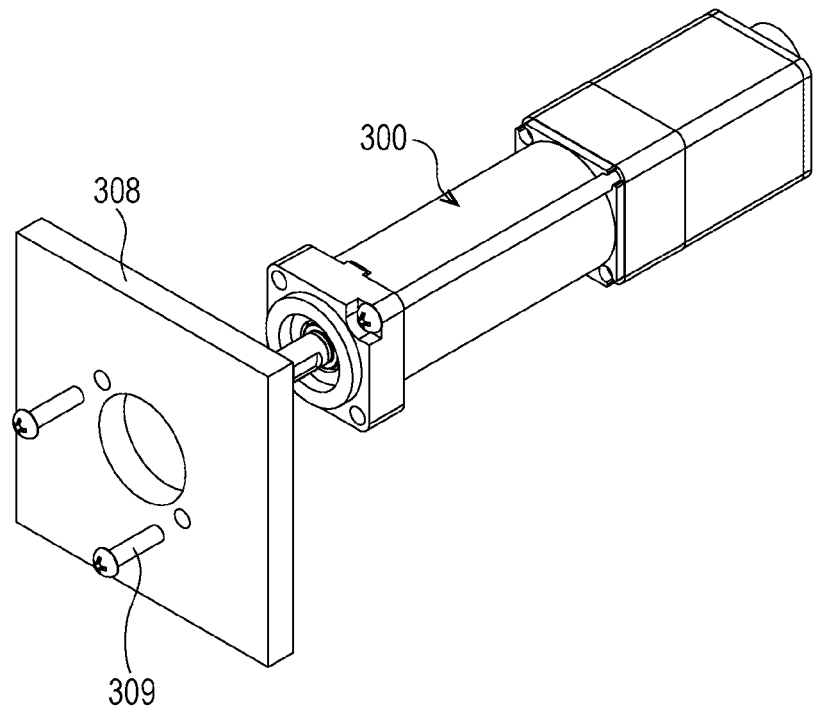
FIG. 9 is a perspective view illustrating a motor mount plate of a conventional motor structure before being assembled.

FIG. 9 is a perspective view illustrating a motor mount plate of a conventional motor structure before being assembled. FIG. 10 is a perspective view of the motor mount plate of the conventional motor structure after being assembled.

Figure 10:
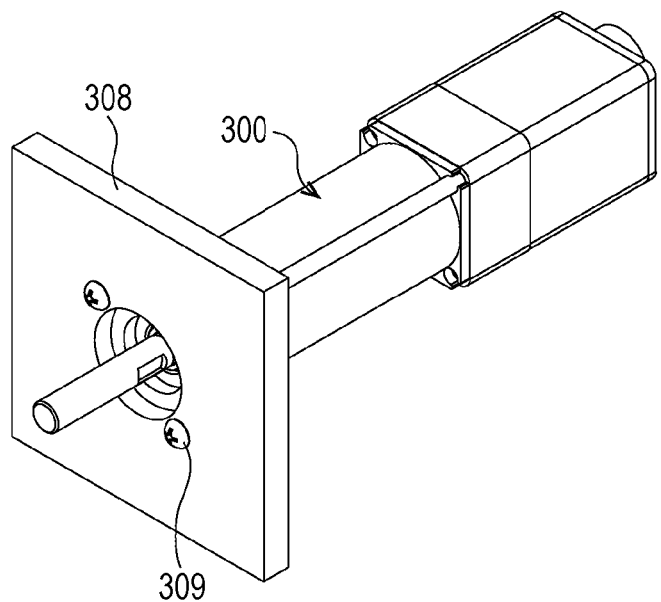
FIG. 10 is a perspective view illustrating the motor mount plate of the conventional motor structure after being assembled.

As illustrated in FIGS. 9 and 10, the operation of assembling a motor 300 and a motor mount plate 308 is performed from the output side of the motor 300. That is, the heads of mounting bolts 309 rest on the motor mount plate 308 by screwing the mounting bolts 309 into the output-side end of the motor 300 from the side of the motor mount plate 308.

With the conventional motor mount plate assembly structure, however, the assembly operation is performed from the output side. Therefore, the workability of the assembly operation is very poor when the radial size of the motor is small and/or the motor is to be mounted in a small space. Thus, there have been demands from motor users for a motor mount plate assembly structure (motor structure) in which mounting bolts can be fastened from the anti-output side, as in the present embodiment.

That is, with the assembly structure of the motor mount plate 8 of the present embodiment, the operation of mounting the motor mount plate 8 can be performed from the anti-output side. Therefore, even if the motor radial size is small and/or the motor is mounted in a small space, the operation of mounting the motor mount plate 8 can be performed easily.

Preferred embodiments of the present disclosure have been described above. However, the foregoing description is intended only for illustration of the present disclosure, and is not intended to limit the technical scope of the present disclosure to the foregoing embodiments. The technique of the present disclosure can be carried out in various modes different from the foregoing embodiments without deviating from the gist of the present disclosure.

The present disclosure relates to a motor structure, and also particularly to improvements to a frame structure and a motor mount plate assembly structure.

Embodiments of the motor structure of the present disclosure may include the following first to eighth motor structures.

A first motor structure is a motor structure including a frame, a stator, a rotor, an output-side bracket, and an anti-output-side bracket, wherein: a housing portion of an output-side bearing is formed integrally with the frame on the output-side end of the frame; the outer diameter of the housing portion serves as a fitting protrusion; a flange portion having an opening is formed integrally with the frame on the anti-output-side end of the frame: a protrusion to be fitted into the opening of the flange portion is formed integrally with the anti-output-side bracket for accommodating an anti-output-side bearing therein; the output-side bracket is fitted over the fitting protrusion; and the protrusion of the anti-output-side bracket is fitted into the opening of the flange portion.

A second motor structure, in the first motor structure, is configured such that the fitting protrusion and the output-side bracket have a positioning structure.

A third motor structure, in the first or second motor structure, is configured such that a precompressed spring is sandwiched between the output-side bearing and the output-side bracket.

A fourth motor structure, in any one of the first to third motor structures, is configured such that the flange portion and the anti-output-side bracket have a positioning structure.

A fifth motor structure, in any one of the first to fourth motor structures, is configured such that the anti-output-side bearing is fixed in the anti-output-side bracket by a bearing bolt.

A sixth motor structure, in any one of the first to fifth motor structures, is configured such that the output-side bracket is fitted over the fitting protrusion of the frame while the anti-output-side bracket abuts against the flange portion, and the protrusion of the anti-output-side bracket is fitted into the opening of the flange portion while the frame is sandwiched between the output-side bracket and the anti-output-side bracket, so that the output-side bracket and the anti-output-side bracket are fastened by a through bolt inserted therethrough from the output side.

A seventh motor structure, in any one of the first to sixth motor structures, is configured such that the frame is made of an iron-based ferromagnetic material.

An eighth motor structure, in any one of the first to seventh motor structures, wherein a seat surface for a mounting bolt for mounting a motor mount plate is formed on the anti-output-side bracket, and the motor is mounted onto the motor mount plate by fastening the mounting bolt from the anti-output side.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A motor structure comprising:
   a frame accommodating a stator and a rotor therein, the frame comprising a cylindrical portion;
   an output-side bracket;
   an output-side bearing;
   a housing portion for supporting the output-side bearing, the housing portion being formed integrally with an output-side end of the frame and serving as a first fitting protrusion to be fitted into the output-side bracket;
   a flange portion formed integrally with an anti-output-side end of the frame and having an opening;
   an anti-output-side bearing;
   an anti-output-side bracket for accommodating the anti-output-side bearing therein; and
   a protrusion formed integrally with the anti-output-side bracket to be fitted into the opening of the flange portion,
   wherein the housing portion has an inner peripheral surface that is parallel to an axis of the cylindrical portion of the frame,
   the output-side bearing has an outer peripheral surface that is parallel to the axis of the cylindrical portion of the frame, and
   the inner peripheral surface of the housing portion is in direct contact with the outer peripheral surface of the output-side bearing.

2. The motor structure according to claim 1, further comprising a first positioning structure for positioning the frame and the output-side bracket.

3. The motor structure according to claim 2, wherein the first positioning structure includes
   a positioning depression formed on the frame, and
   a positioning protrusion formed on a contact surface of the output-side bracket which contacts the frame, the positioning protrusion engaging with the positioning depression.

4. The motor structure according to claim 1, further comprising a precompressed spring sandwiched between the output-side bearing and the output-side bracket.

5. The motor structure according to claim 1, further comprising a second positioning structure for positioning the flange portion and the anti-output-side bracket.

6. The motor structure according to claim 5, wherein the second positioning structure includes
   a fitting depression formed on an abutment surface of the anti-output-side bracket which abuts against the flange portion, and
   a second fitting protrusion formed on an abutment surface of the flange portion which abuts against the anti-output-side bracket and fitted into the fitting depression.

7. The motor structure according to claim 1, further comprising a bearing bolt, wherein
   the anti-output-side bearing is fixed in the anti-output-side bracket by the bearing bolt.

8. The motor structure according to claim 1, further comprising a through bolt to be inserted through the output-side bracket and the anti-output-side bracket from an output side to fasten the output-side bracket and the anti-output-side bracket so that the frame is sandwiched between the output-side bracket and the anti-output-side bracket.

9. The motor structure according to claim 1, wherein the frame is made of an iron-based ferromagnetic material.

10. The motor structure according to claim 1, further comprising:
    a motor mount plate arranged to abut against the output-side bracket; and
    a mounting bolt, wherein
    the anti-output-side bracket includes a seat surface for the mounting bolt, and
    the mounting bolt is inserted through the anti-output-side bracket and the motor mount plate from an anti-output side to fasten the anti-output-side bracket and the motor mount plate.

11. The motor structure according to claim 1, wherein the output-side bracket is fastened to the anti-output-side bracket by two through bolts, and
    two heads of the two through bolts rest on the output-side bracket.

12. The motor structure according to claim 1, wherein when viewed in a direction parallel to the axis of the cylindrical portion of the frame, the output-side bracket has a rectangular shape and projects radially outwardly from the outermost of the cylindrical portion of the frame.

13. The motor structure according to claim 1, wherein when viewed in a direction parallel to the axis of the cylindrical portion of the frame, the flange portion has a rectangular shape and projects radially outwardly from the outermost of the cylindrical portion of the frame.

14. The motor structure according to claim 1, wherein when viewed in a direction parallel to the axis of the cylindrical portion of the frame, the anti-output-side bracket has a rectangular shape and projects radially outwardly from the outermost of the cylindrical portion of the frame.

* * * * *